US 6,577,506 B1

(12) United States Patent
Wakita et al.

(10) Patent No.: US 6,577,506 B1
(45) Date of Patent: Jun. 10, 2003

(54) CARD TYPE ELECTRONIC DEVICE

(75) Inventors: Maki Wakita, Tokyo (JP); Katsutoshi Mukaijima, Tokyo (JP)

(73) Assignees: Iomega Corporation, Roy, UT (US); Citizen Watch Corporation, Tokyo (JP)

(*) Notice: Subject to any disclaimer, the term of this patent is extended or adjusted under 35 U.S.C. 154(b) by 0 days.

(21) Appl. No.: 09/582,374
(22) PCT Filed: Oct. 26, 1999
(86) PCT No.: PCT/JP99/05921
§ 371 (c)(1),
(2), (4) Date: Jun. 22, 2000
(87) PCT Pub. No.: WO00/25316
PCT Pub. Date: May 4, 2000

(30) Foreign Application Priority Data

Oct. 27, 1998 (JP) .......................................... 10-321421
Jun. 18, 1999 (JP) .......................................... 11-171742

(51) Int. Cl.[7] .............................. H05K 5/02; H05K 7/18
(52) U.S. Cl. ..................... 361/737; 361/740; 361/756; 439/76.1
(58) Field of Search ................................ 361/737, 736, 361/752, 741, 740, 756, 759, 747; 174/50, 250; 439/76.1

(56) References Cited

U.S. PATENT DOCUMENTS

| 5,339,222 A | * | 8/1994 | Simmons et al. ........... 361/818 |
| 5,476,387 A | * | 12/1995 | Ramey et al. .............. 439/76.1 |
| 5,481,432 A | * | 1/1996 | Tsukada et al. ............. 361/686 |
| 5,493,477 A | * | 2/1996 | Hirai ........................... 361/737 |
| 5,502,604 A | * | 3/1996 | Furay ....................... 360/97.01 |
| 5,563,450 A | * | 10/1996 | Bader et al. ................. 257/785 |
| 5,747,735 A | * | 5/1998 | Chang et al. .................. 174/51 |
| 6,324,076 B1 | * | 11/2001 | Gerrits et al. ............... 361/818 |

* cited by examiner

Primary Examiner—David Martin
Assistant Examiner—Dameon E. Levi
(74) Attorney, Agent, or Firm—Woodcock Washburn LLP

(57) ABSTRACT

A card-type electronic device comprises a casing (4) composed of a rectangular frame (5) and two covers (6, 7) individually covering the upper and lower surfaces of the frame (5). Substantially U-shaped retaining pieces (11a, 11b) are formed by bending tongues (10), which partially protrude from the long side edge portions of the covers (6, 7), so that their distal ends are directed toward the other covers (6, 7) and further bending the distal ends on the inner peripheral side. On the other hand, the side faces of the frame (5) are formed with recesses (19a, 19b) for vertically guiding the retaining pieces (11a, 11b) and retaining portions (20a, 20b) adapted individually to engage the retaining pieces (11a, 11b) fitted in the recesses when the retaining pieces slide in the longitudinal direction of the casing (4).

3 Claims, 15 Drawing Sheets

CARD TYPE ELECTRONIC DEVICE

TECHNICAL FIELD

The present invention relates to a card-type electronic device adapted to be set in an information apparatus, such as a portable computer, and capable of receiving and providing information.

BACKGROUND ART

In order to add functions to or increase the data throughput of an information apparatus such as a portable computer, a card-type electronic device (PC card) is attached to a slot of the apparatus. This card-type electronic device is loaded with a cartridge that is composed of a disk-type storage medium rotatably stored in a shell.

A prior art example of the card-type electronic device described above will now be described with reference to FIGS. 14, 15A and 15B.

A card-type electronic device 1 comprises a casing 4 that has external dimensions based on Type II of the PCMCIA (Personal Computer Memory Card International Association) standards. The casing 4 is formed by combining metallic upper and lower covers 6 and 7 and a frame 5 of a synthetic resin (see FIGS. 15A and 15B).

The casing 4 has a storage space for a cartridge 17 therein, and is stored with mechanical parts (not shown), such as a motor for driving a magnetic recording disk 52 and a motor for driving a recording/reproducing head, a circuit board (not shown) for controlling these motors, and the like.

The front end portion of the casing 4 is fitted with a connector 2 that can engage a connector attached to a computer (not shown). On the other hand, the rear end portion of the casing 4 is formed with a cartridge inlet slot 90 through which the cartridge 17 is inserted into the card-type electronic device 1 (i.e., into the cartridge storage space of the casing 4).

The cartridge 17 is composed of a disk casing 95 and a magnetic recording disk 52 for use as a magnetic storage medium that is stored in the disk casing 95 and rotatably supported by means of the disk casing 95.

As the card-type electronic device 1 is moved in the direction of arrow A of FIG. 14, it is inserted into a slot in the computer, and the connector 2 engages a pin on the computer. As the cartridge 17 is moved in the direction of arrow B of FIG. 14, moreover, it is loaded into the card-type electronic device 1 through the cartridge inlet slot 90.

Since the card-type electronic device 1 is based on Type II of the PCMCIA standards, as mentioned before, its external dimensions (width by length by thickness) are 54.0 mm by 85.60 mm by 5.0 mm.

According to the PCMCIA standards, moreover, it is stipulated that the respective front end portions (connector storage portions 6b and 7b mentioned later) and left- and right-hand sides (insertion guide portions 6d and 7d mentioned later; the insertion guide portion 7d of the lower cover 7 is not shown in FIG. 14) of the upper and lower covers 6 and 7 that constitute the casing 4 should be formed with step portions that are 0.8 mm to 0.9 mm lower than central portions (internal component storage portions 6a and 7a mentioned later).

Further, the thickness (T1 of FIG. 15A) of a collar portion 2a (mentioned later) of the connector 2 and the distance (equal to T1 of FIG. 15B, that is, the distance between a connector storage portion 6b flush with the insertion guide portion 6d and the connector storage portion 7b flush with the insertion guide portion 7d) between the insertion guide portion 6d of the upper cover 6 and the insertion guide portion 7d of the lower cover 7 that serve as guides for the insertion into the slot of the computer are both 3.3 mm (standard).

In the PC card of this type, as is described in Registered Japanese Utility Model No. 3024721 and Japanese Patent Application Laid-open 5-254286, stepped peripheral edge portions are formed individually on the respective peripheral portions of upper and lower covers by step drawing in order to form the aforesaid step portions, the respective inner surfaces of the peripheral edge portions are fixed individually to the upper and lower surfaces of a frame 5 by adhesive bonding, laser welding, or brazing, and the upper and lower covers and the frame 5 are assembled to form a casing, in general.

Since the cartridge 17 shown in FIG. 14 has the magnetic recording disk 52 stored for rotation therein, moreover, it is expected to have a fixed thickness. In consequence, a satisfactory thickness must be given to the casing 4 in order to store the cartridge 17 with the fixed thickness in the casing 4 that is composed of the upper and lower covers 6 and 7.

The satisfactory thickness can be given to the casing 4 by narrowing the areas of the lower-step portions (i.e., connector storage portions 6b and 7b and insertion guide portions 6d and 7d) that are formed on the respective front end portions and left- and right-hand side portions of the upper and lower covers 6 and 7, thereby widening the areas of the elevated central portions (internal component storage portions 6a and 7a) correspondingly.

However, the lower-step portions at the respective front end portions and left- and right-hand side portions of the upper and lower covers 6 and 7 are utilized as areas for adhesive bonding with the frame 5. If these areas are narrowed, therefore, the areas of adhesive bonding between the metallic covers (upper and lower covers 6 and 7) and the synthetic resin frame 5 are reduced, so that bonding force between the metallic covers 6 and 7 and the synthetic resin frame is lowered inevitably. In consequence, the metallic covers 6 and 7 may is possibly separate from the frame 5 during use of the PC card.

In the PC card of the type that is loaded with the cartridge 17 storing the disk-type magnetic storage medium 52 therein, the mechanism is so complicated that the casing 4 must be opened for inspection, in some cases. If the metallic covers 6 and 7 and the synthetic resin frame 5 are fixed together by welding or brazing or bonded firmly, the metallic covers 6 and 7 cannot be removed, thus causing inconvenience.

If the metallic covers 6 and 7 are forced to be removed from the synthetic resin frame 5, moreover, a great external force acts on the casing 4, possibly destroying internal components.

Referring now to FIGS. 15A and 15B, there will be described an arrangement for bonding the connector 2 between the upper and lower covers 6 and 7 of FIG. 14.

As mentioned before, the upper and lower covers 6 and 7 are obtained by pressing thin SUS sheets with a thickness t1 of about 0.20 mm so that first flat portions (i.e., internal component storage portions 6a and 7a) are formed in their respective central portions, and second flat portions (i.e., connector storage portions 6b and 7b and insertion guide portions 6d and 7d), which are depressed toward the inner surface side from the first flat portions, are formed extending from the front portions to the opposite side portions.

The internal components, including a recording/reproducing head element, disk drive motor, etc., are stored between the respective first flat portions of the upper and lower covers 6 and 7. Thus, the respective first flat portions of the upper and lower covers 6 and 7 constitute the internal component storage portions 6a and 7a, respectively.

As shown in FIG. 14, the respective second flat portions of the upper and lower covers 6 and 7 are composed, respectively, of the insertion guide portions 6d and 7d, which serve as insertion guides for the computer, and the connector storage portions 6b and 7b for storing the connector 2. The insertion guide portions 6d and 7d and the connector storage portions 6b and 7b have no differences in level, and are formed flush with one another in pressing processes for forming the first and second storage portions individually on the upper and lower covers 6 and 7.

On the other hand, that portion (collar portion 2a) of the connector 2 which is exposed outward from the connector storage portions 6b and 7b of the second flat portions formed on the upper and lower covers 6 and 7 has the thickness (T1) of 3.3 mm (standard), and a portion (stepped junction 2b) stored between the connector storage portions 6b and 7b has a thickness (T2) of about 2.8 mm. As shown in FIG. 15A, therefore, a difference in level T3 between T1 and T2 is 0.25 mm.

As shown in FIG. 15B, moreover, a sheet thickness T4 of the frame 5 is 2.8 mm, which is equal to the thickness T2(=2.8 mm) of the stepped junction 2b formed on the connector 2.

The fixing between the connector storage portions 6b and 7b of the second flat portions formed individually on the upper and lower covers 6 and 7, the stepped junction 2b of the connector 2, and the frame 5 is generally based on the application of an adhesive agent 38 by the screen printing method. A thickness t2 (margin for adhesive bonding) of the adhesive layer ranges from about 0.05 mm to 0.06 mm, and high workability for adhesive bonding and. required bonding strength can be secured with use of the margin for adhesive bonding corresponding to this thickness.

A dimension (=t1+t2) obtained by adding the margin (t2) for adhesive bonding to the thickness (t1) of the upper and lower covers 6 and 7 is 0.25 mm, which is equal to the dimension (0.25 mm) of the aforesaid difference in level T3 of the connector 2. Thus, the surface of the collar portion 2a of the connector 2 is flush with the respective surfaces of the connector storage portions 6b and 7b which are the second flat portions formed on the upper and lower covers 6 and 7, and the connector 2 is fixed to the upper and lower covers 6 and 7.

In order to improve the functions of the card-type electronic device further, it is essential to extend the storage space for the internal components. Presumably, therefore, the storage space may be extended by reducing the respective thicknesses t1 of the upper and lower covers 6 and 7 from 0.20 mm to 0.15 mm.

Thereupon, the margin t2 for adhesive bonding must be restricted within the range from 0.05 mm or 0.06 mm to 0.1 mm in order to bond the upper and lower covers 6 and 7 to the connector 2 without failing to ensure the extension of the storage space for the internal components (e.g., electronic devices mounted on the circuit board). There is a problem, however, such that the bonding strength cannot be secured in the aforesaid manner with use of a margin for adhesive bonding corresponding to a thickness of 0.1 mm.

Further, set dimensions for the thickness T2(=2.8 mm) of the stepped junction 2b of the connector 2 vary according to manufacturers. In the case where T2=2.7 mm or 2.9 mm is given, for example, the margin for adhesive bonding is so unstable that the bonding strength lowers if the thickness of the collar portion of the connector is maintained T1=3.3 mm (standard), as mentioned before.

In order to solve these problems, therefore, the card-type electronic device is expected to be designed so that the respective sheet thicknesses of the upper and lower covers are reduced to enlarge the storage space for the internal components, its functions can be improved, it can cope with change of the set dimensions of the connector, and it enjoys good working accuracy and outstanding workability.

DISCLOSURE OF THE INVENTION

The object of the present invention is to provide a card-type electronic device comprising a casing composed of a frame for use as a storage portion for individual components and upper and lower covers covering the upper and lower surfaces, individually, of the frame, in which the upper and lower covers are coupled firmly to each other, and the upper or lower cover can be easily removed as required.

Substantially U-shaped retaining pieces are formed on the long side edge portions of at least one cover. The retaining pieces are formed substantially U-shaped by bending the respective distal ends of tongues, which partially protrude from the long side edge portions of the cover, toward the other cover and further bending the distal ends on the inner peripheral side. On the other hand, the side faces of the frame are formed with recesses for vertically guiding the retaining pieces and retaining portions adapted individually to engage the retaining pieces fitted in the recesses when the retaining pieces are slid in the longitudinal direction of the casing.

When the retaining pieces and the retaining portions engage one another, the cover and the frame are temporarily fixed to each other, whereby the cover can be prevented from coming off up- or downward.

In removing the cover, the cover is slid in the direction opposite to the direction of its attachment along the length of the casing, whereupon the retaining pieces and the retaining portions are disengaged from one another. After the retaining pieces are returned to the positions of the recesses, the retaining pieces are drawn out of the recesses.

The card-type electronic device of the present invention can further have the following configuration.

The connection between the cover and the frame is further strengthened by providing slide preventing means for preventing the retaining pieces from moving in the longitudinal direction after the cover and the frame are temporarily fixed to each other with the engagement of the retaining pieces with the retaining portions. The slide preventing means includes screwing, adhesive bonding, caulking, etc. In the case where the cover requires attachment and detachment, however, the slide preventing means is configured by screwing or weak adhesive bonding so that the cover can be easily removed from the frame.

The slide preventing means is provided on the short side of the casing. This is done because the short side of the casing affords a wider region for screwing or adhesive bonding than the long side does, so that reliable slide preventing means can be provided with ease.

A peripheral edge portion is formed on the long side edge portion of the cover by step drawing, and the tongues are provided on the distal end edge of the edge portion.

The distal end side of the edge portion that is formed by the step drawing of the cover is bent throughout its length toward the other cover, whereby a bent wall is formed. The aforesaid tongues are provided protruding from the distal end edge of the bent wall, and the tongues are bent inward along the distal end line of the bent wall, whereupon the retaining pieces are formed.

The vertical dimension of the bent wall of the cover on the top side is made different from the vertical dimension of the cover on the bottom side.

A frame plate for mounting the components on the frame is formed as one body by outsert molding or the like, and a drive unit for magnetic recording and reading is incorporated in the frame plate.

The frame is formed of a synthetic resin and is fitted integrally with the frame plate by outsert molding.

The upper cover and the frame can be temporarily fixed to each other by sliding, a magnetic recording device is mounted on the top side of the frame plate, and a circuit board is located on the bottom side. Since the magnetic recording device has a complicated delicate construction, it sometimes requires inspection. The inspection is easy if the upper cover is removable.

A connector for connecting an external information apparatus to the circuit board is provided, and this connector is exposed on one short side of the casing. Further, an inlet for a magnetic storage medium is formed on the other short side of the casing. Both these elements, like those of conventional PC cards, are easy to handle.

The slide preventing means is provided on one short side of the upper cover or lower cover.

The slide preventing means of the cover is used as fixing means that is expected to be removed or fixing means that is not expected to be removed. The slide preventing means of one of the covers, e.g., the upper cover, may be designed to be fixing means that is expected to be removed so that the cover can be easily removed to facilitate operation for inspection. Further, the strength of the casing can be kept high enough by securely fixing the lower cover to the frame.

BEST MODE FOR CARRYING OUT THE INVENTION

A first embodiment of a card-type electronic device according to the present invention will be described with reference to FIGS. 1 to 7.

Figure 2:
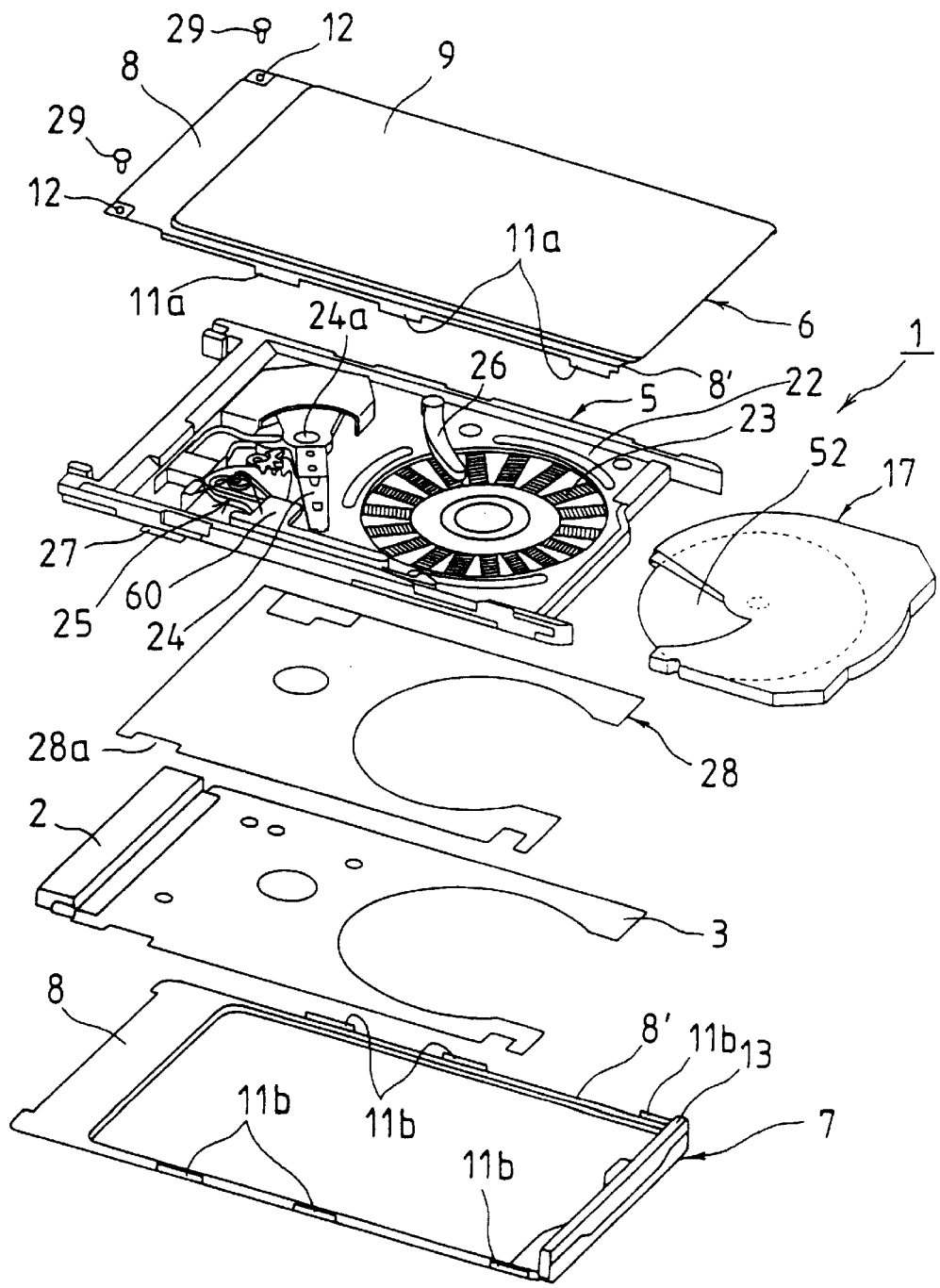
FIG. 2 is an exploded perspective view of the card-type electronic device according to the first embodiment of the present invention.
Figure 4:
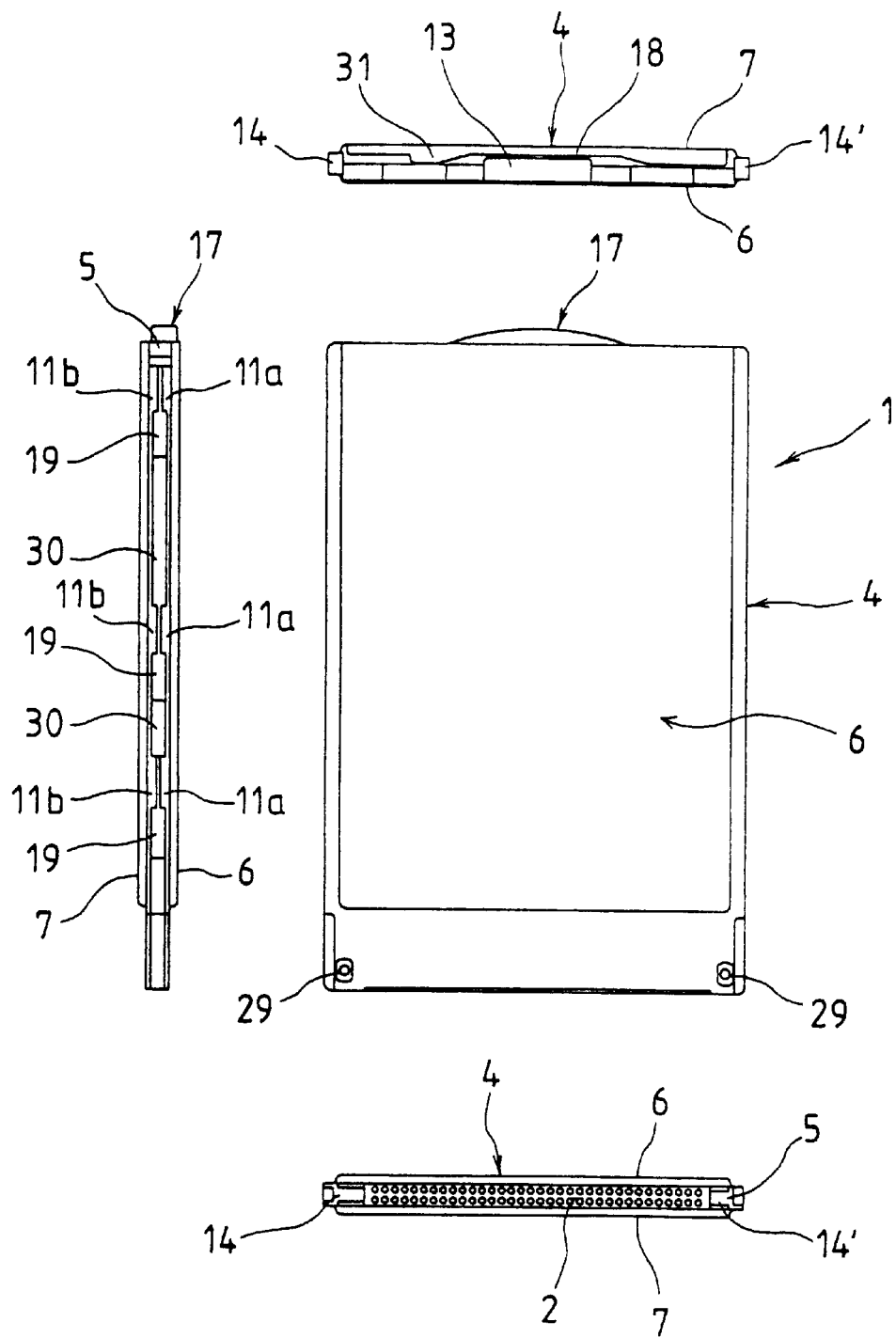
FIG. 4 is a development showing the top surface, side face, front face, and rear face of the card-type electronic device shown in FIG. 2.

As shown in FIGS. 2 and 4, a card-type electronic device 1 comprises a casing 4, a connector 2 stored in the casing 4, a circuit board 3, and components such as a magnetic recording device. The casing 4 is composed of a frame 5 that defines therein a storage portion for the individual components and metallic upper and lower covers 6 and 7 that cover the upper and lower surfaces, respectively, of the frame 5.

The external dimensions of the card-type electronic device 1 are based on the standard Type II of PCMCIA. The device 1 has upper and lower surfaces in the form of a rectangle with one side 54.0 mm long and the other side 85.60 mm each, and is 5.00 mm thick.

The upper and lower covers 6 and 7 are formed by pressing a stainless-steel sheet with the thickness of 0.15 mm. The stainless-steel sheet is relatively hard and has high stiffness despite its thinness.

The upper and lower covers 6 and 7 (or the casing 4 that is composed of the upper and lower covers 6 and 7 and the frame 5) will now be described on the assumption that the connector 2 is mounted on the front side and a socket (loading/unloading slot 18) for a cartridge 17 is located on the rear side.

Figure 3:
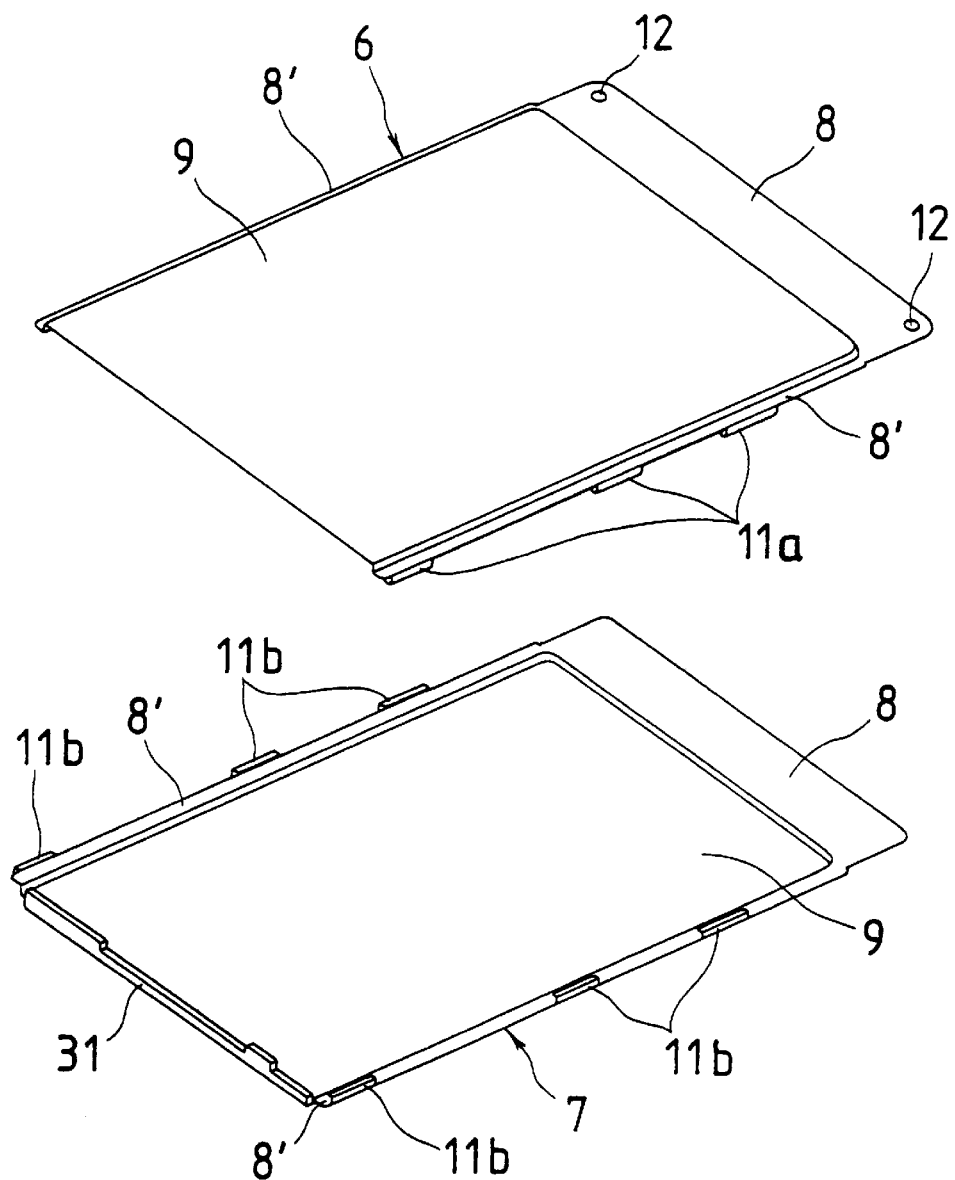
FIG. 3 is a perspective view of upper and lower covers constituting the casing of the card-type electronic device shown in FIG. 2.

In each of the upper and lower covers 6 and 7, a front edge portion 8, about 10 mm wide, is formed on its front end portion by step drawing, and a side edge portion 8', 1 to 1.5 mm wide, is formed on each of its opposite side end portions, left and right. A raised portion 9 (raised portion formed by step drawing), which is 0.8 to 0.9 mm higher than the front edge portion 8 (and the side edge portions 8' also) is formed in the central portion of each of the upper and lower covers 6 and 7 other than the front edge portion and the left- and right-hand side edge portions (FIG. 3). The capacity of the component storage portion can be increased by forming these raised portions 9.

Figure 14:
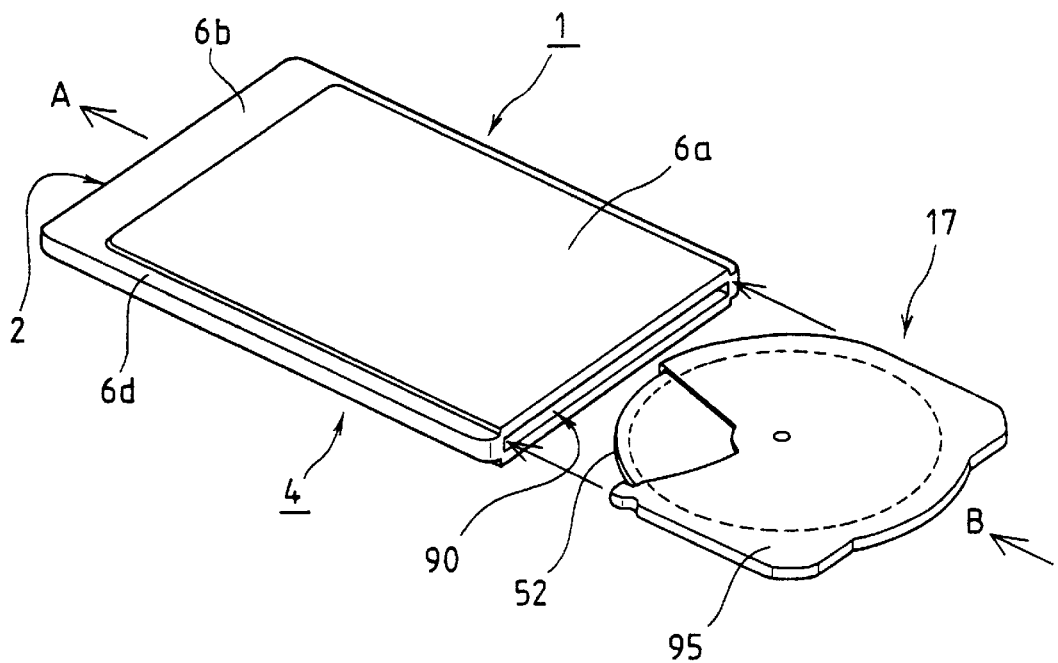
FIG. 14 is an exploded perspective view showing an external appearance of an example of a conventional card-type electronic device.
Figure 15A:
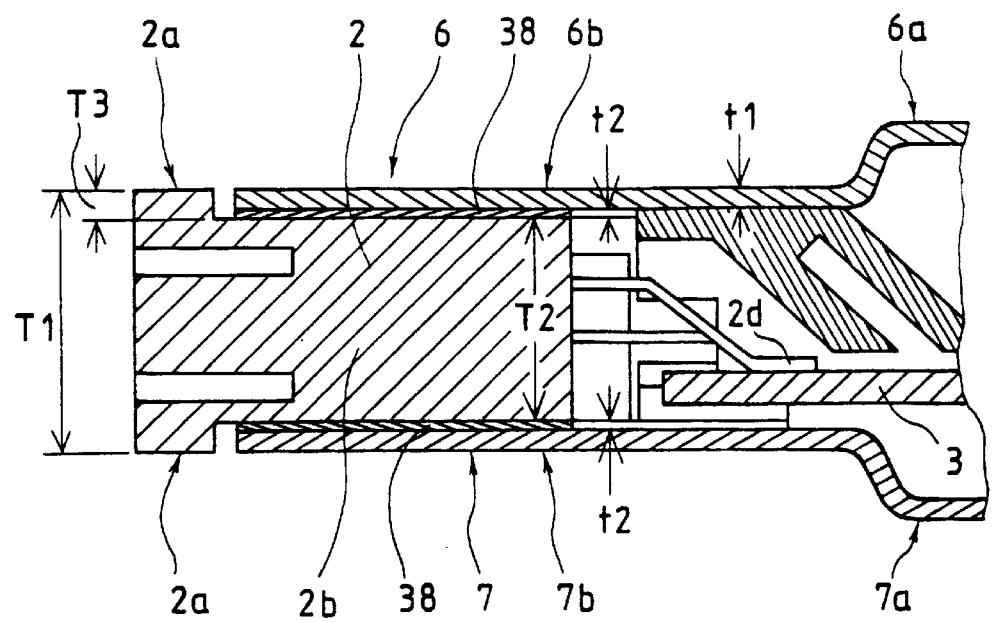
FIG. 15A is a sectional view of an arrangement near a connector taken along a long side of the card-type electronic device of FIG. 14.
Figure 15B:
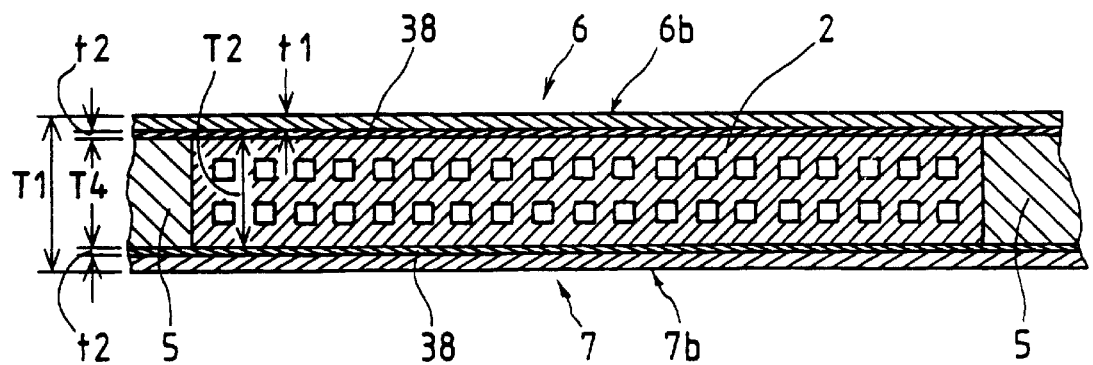
FIG. 15B is a sectional view of an arrangement near the connector taken along a short side of the card-type electronic device of FIG. 14.

The front edge portions 8 and the left- and right-hand side edge portions 8' of the upper and lower covers 6 and 7 correspond to the connector storage portions 6b and 7b and the insertion guide portions 6d and 7d shown in FIGS. 14, 15A and 15B, and the raised portions 9 correspond to the internal component storage portions 6a and 7a, individually.

A plurality of (three in the example shown in FIG. 2) tongues 10 (indicated by dotted line in FIG. 1) are formed projecting at suitable spaces from one another on the respective end edges of the side edge portions 8' of the upper and lower covers 6 and 7. Each tongue 10 has a width of 5 to 6 mm. As indicated by full line in FIG. 1, retaining pieces 11a and 11b having a substantially U-shaped cross section are formed by bending the respective distal ends of the tongues 10 along a side face of the frame 5 toward the covers opposite thereto (i.e., toward the lower cover 7 for the tongue 10 of the upper cover 6 and toward the upper cover 6 for the tongue 10 of the lower cover 7) and further bending the distal ends inward.

As shown in FIG. 2, moreover, screw passage holes 12 are formed individually in the left- and right-hand side portions of the front edge portion 8' of the upper cover 6.

A shutter 13, which openably closes the rear end face of the casing 4 throughout its length, is attached to the inside of the rear end edge of the lower cover 7 (FIG. 2), and an upright wall 31 for restraining the shutter 13 from rocking outward is set up on the rear end edge (FIG. 3). Normally, the shutter 13 is urged to stand and engage the inner surface of the upright wall 31.

Figure 5:
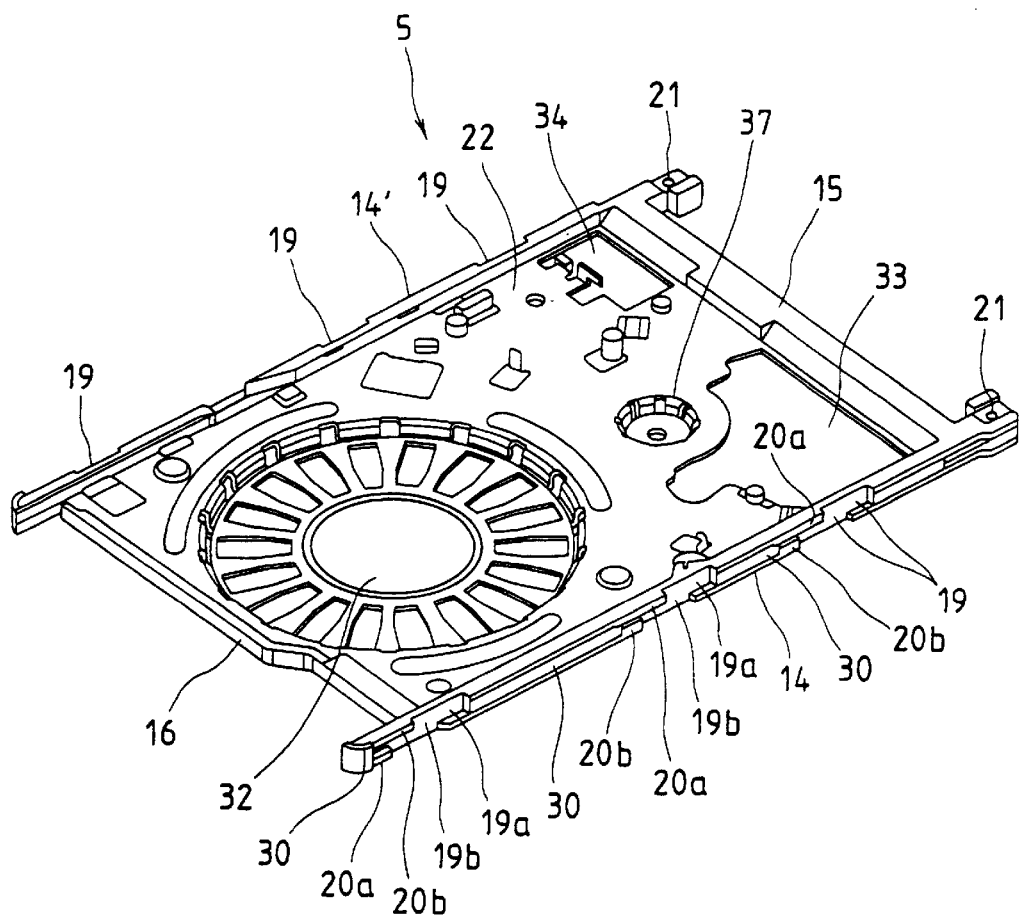
FIG. 5 is a view of the card-type electronic device shown in FIG. 2 taken diagonally from above, showing its frame and frame plate with its upper cover off.
Figure 6:
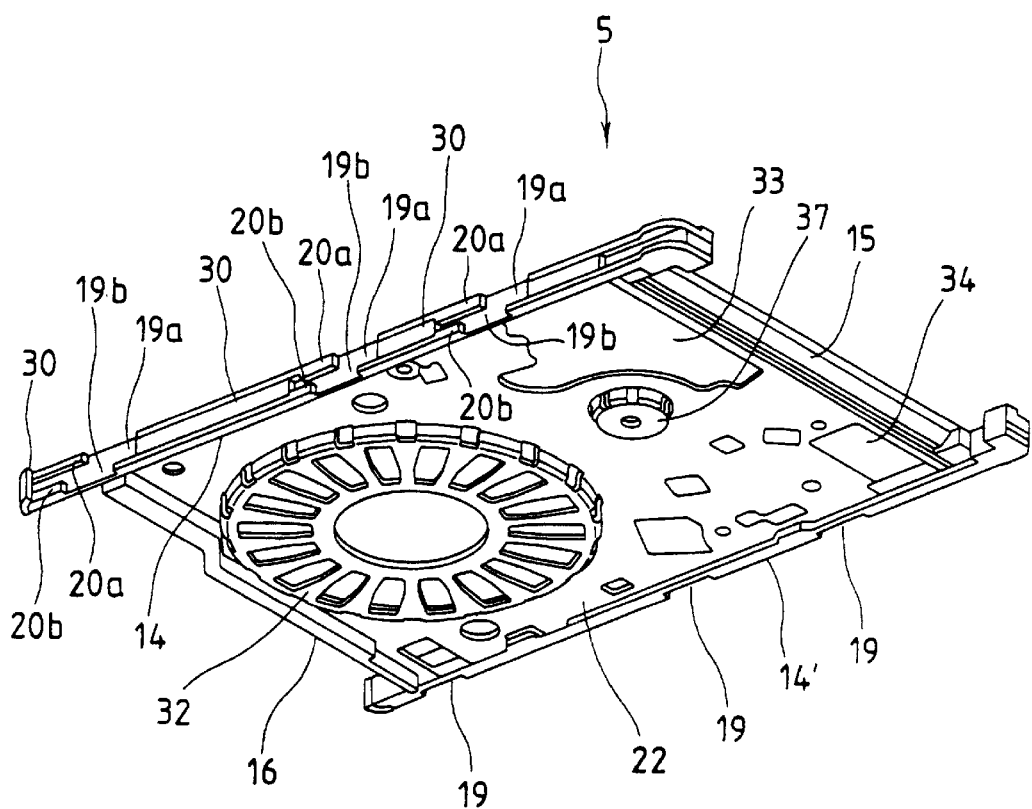
FIG. 6 is a view of the card-type electronic device shown in FIG. 2 taken diagonally from below, showing its frame and frame plate with its lower cover off.

The frame 5, which is formed of a polycarbonate resin reinforced with a glass filler, comprises a right-hand side frame portion 14, a left-hand side frame portion 14', a front frame portion 15, and a rear frame portion 16, as shown in FIGS. 5 and 6.

In order to fit the connector 2 between the front end of the right-hand side frame portion 14 and the front end of the left-hand side frame portion 14', the front frame portion 15 is located in a position receded from the respective front ends of the side frame portions 14 and 14' by a distance corresponding to the width of the connector 2. Further, the thickness (vertical dimension) of the front frame portion 15 is made smaller than those of the side frame portions 14 and 14' so that the distal end edge of a circuit board 3 connected with the connector 2 can be lapped on the lower surface of the front frame portion 15. As shown in FIG. 5, however, the front frame portion 15 is located so that its upper surface is flush with the respective upper surfaces of the side frame portions 14 and 14'.

In order to form the loading/unloading slot 18 for the cartridge 17 (FIGS. 2 and 4), the rear frame portion 16 has its thickness (vertical dimension) made smaller than those of the side frame portions 14 and 14' and its lower surface flush with those of the side frame portions 14 and 14'. Besides, the rear frame portion 16 is located in a position just ahead of the respective rear ends of the side frame portions 14 and 14' so that is does not hinder the rocking motion of the shutter 13.

When the cartridge 17 is not set in place, the shutter 13 on the lower cover 7 closes the loading/unloading slot 18.

Figure 1:
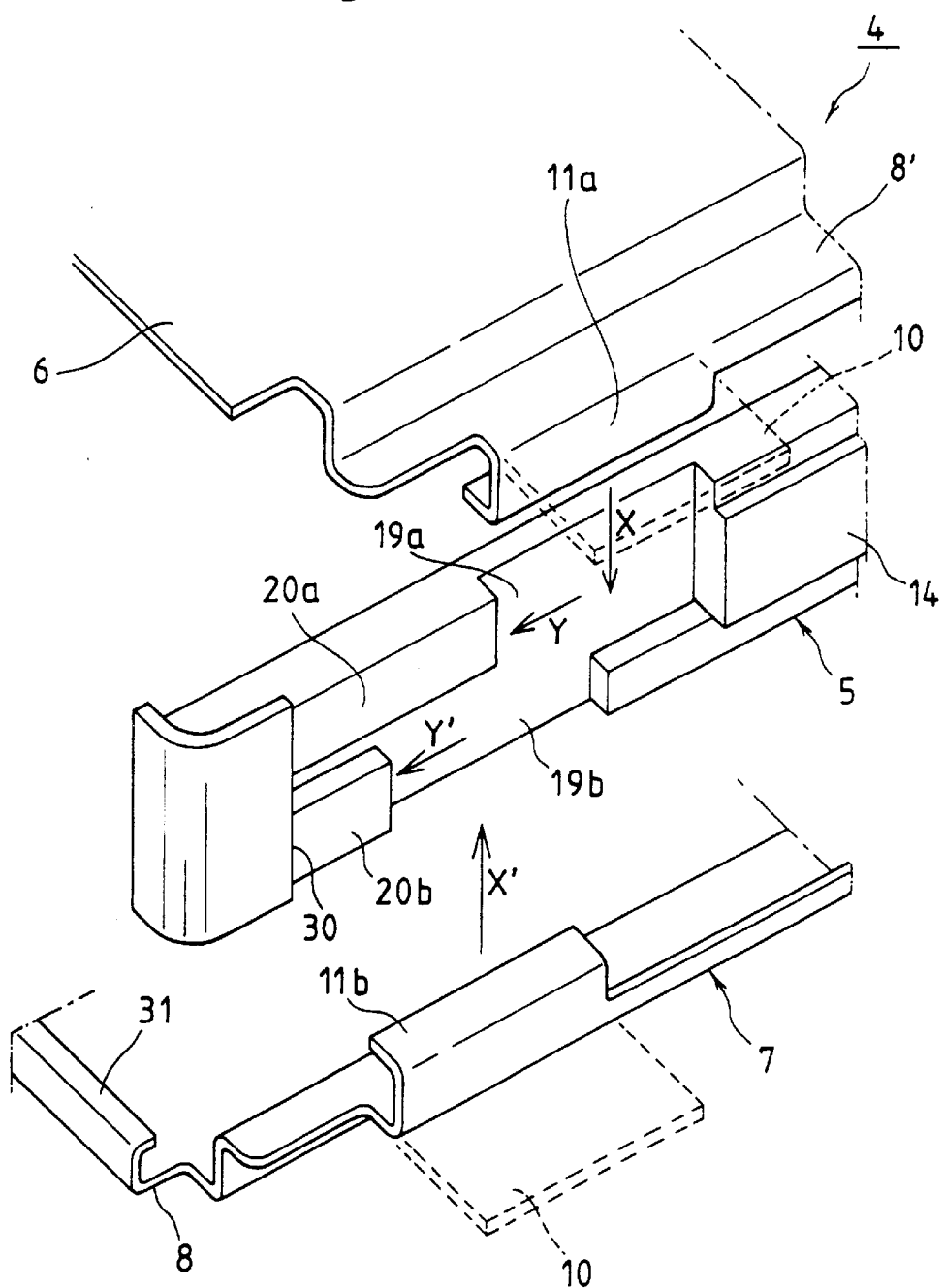
FIG. 1 is a partial perspective view for illustrating the construction of a casing of a card-type electronic device according to a first embodiment of the present invention.

As shown in FIG. 1, recesses 19a for vertically guiding the retaining pieces 11a of the upper cover 6 are formed extending downward in the respective outer side faces of the side frame portions 14 and 14' of the frame 5, while recesses 19b for vertically guiding the retaining pieces 11b of the lower cover 7 are formed extending upward.

The upper cover 6 is designed so that it is slid rearward (in the direction of arrow Y of FIG. 1) to engage retaining portions 20a (mentioned later) formed individually on the respective outer side faces of the side frame portions 14 and 14' after its retaining pieces 11a are fitted individually into the recesses 19a of the side frame portions 14 and 14'. Accordingly, the respective openings (to receive the retaining pieces 11a) of the recesses 19a are formed in positions that are shifted forward (in the direction opposite to the direction of arrow Y of FIG. 1) by a certain distance from the positions of the side frame portions 14 and 14' that correspond individually to the retaining pieces 11a of the upper cover 6.

The lower cover 7 is designed so that its retaining pieces 11b are fitted individually into the recesses 19a of the side frame portions 14 and 14' and then the lower covers is slid rearward (in the direction of arrow Y' of FIG. 1) to engage retaining portions 20b (mentioned later) formed individually on the respective outer side faces of the side frame portions 14 and 14'. Accordingly, the respective openings (to receive the retaining pieces 11b) of the recesses 19b are formed in positions that are shifted forward (in the direction opposite to the direction of arrow Y' of FIG. 1) for a certain distance from the positions of the side frame portions 14 and 14' that correspond individually to the retaining pieces 11a of the lower cover 7.

The following is a description of the positional relation between the recesses 19a and 19b that are formed in the right-hand side frame portion 14.

The recesses 19a and the recesses 19b are located individually in positions on the side frame portion 14 that are shifted from one another in its length direction Longitudinal direction) for fear that the respective lower surfaces of the retaining pieces 11a of the upper cover 6 should run against the respective upper surfaces of the retaining pieces 11b of the lower cover 7 when the retaining pieces 11a and 11b are fitted into the recesses 19a and 19b, respectively, of the same side frame portion 14.

As shown in FIG. 1, moreover, the recesses 19a and 19b may communicate with each other at a vertically intermediate part of the side frame portion 14.

A passage that extends from each recess 19a to the lower surface of each retaining portion 20a and serves to slide each retaining piece 11a and a passage that extends from each recess 19b to the upper surface of each retaining portion 20b and serves to slide each retaining piece 11b form one passage that continuously extends in the longitudinal direction along a vertically intermediate portion of the right-hand side frame portion 14.

The positional relation between the recesses 19a and 19b that are formed in the right-hand side frame portion 14 described above is directly applicable to the positional relation between the recesses 19a and 19b that are formed in the left-hand side frame portion 14'.

The width (dimension in the longitudinal direction) of the respective openings of the recesses 19a and 19b to receive the retaining pieces 11a and 11b of the upper and lower covers 6 and 7, individually, is a little larger than the width of the retaining pieces 11a and 11b.

Located behind (in the Y direction of FIG. 1) the recesses 19a and adjoining the recesses 19a, the retaining portions 20a that can engage the retaining pieces 11a of the upper cover 6, individually, protrude from the upper surface side of the respective outer side faces of the side frame portions 14 and 14' of the frame 5. Located behind the recesses 19b and adjoining the recesses 19b, likewise, the retaining portions 20b that can engage the retaining pieces 11b of the lower cover 7, individually, protrude from the lower surface side of the respective outer side faces of the side frame portions 14 and 14'.

These retaining portions 20a and 20b are ridges that are a little thinner than their corresponding retaining pieces 11a and 11b in the vertical direction. If the retaining pieces 11a and 11b that are fitted in the recesses 19a and 19b, respectively, are slid rearward in the longitudinal direction of the side frame portion 14, the retaining pieces 11a and 11b engage the retaining portions 20a and 20b, respectively.

Further, a common stopper 30 is formed behind the retaining portions 20a and 20b, projecting outward from the them. The stopper 30 restrains the retaining pieces 11a and 11b from further sliding rearward.

Screw fixing holes 21 corresponding to the screw passage holes 12 of the upper cover 6 are formed in the respective upper surfaces of the front end portions of the side frame portions 14 and 14' (FIGS. 5 and 6).

Inside the frame 5, a stainless-steel frame plate 22 is formed integrally with the frame 5 by molding (outsert molding). The frame plate 22 supports the cartridge 17 that includes a magnetic recording medium (magnetic recording disk 52) formed of a circular film and stored in a shell, and is fitted with a disk drive motor 23 for rotating the magnetic recording disk 52 of the cartridge 17, a recording/reproducing head element 24, a cartridge locking mechanism 25 for positioning and supporting the cartridge 17 that is introduced into the casing 4 through the loading/unloading slot 18, a cartridge delivery lever 26 for forcing out the cartridge 17 from the casing 4, etc.

The disk drive motor 23 is set in a first depression 32 (FIGS. 5 and 6) that is formed in the rear part of the frame plate 22. A rotating shaft 24a of the recording/reproducing head element 24 is mounted in a second depression 37 (FIGS. 5 and 6) that is formed in the front part of the frame plate 22. Further, an eject mechanism 60 of the cartridge locking mechanism 25 is provided for longitudinal sliding motion beside the recording/reproducing head element 24 on the frame plate 22. Furthermore, the cartridge delivery lever 26 is provided for rocking motion behind the recording/reproducing head element 24 on the frame plate 22.

A through hole 34 through which an FPC (flexible printed circuit) 27 is to be passed is formed in that part of the front end portion of the frame plate 22 which is located near the right-hand side frame portion 14'.

When the casing 4 is not loaded with the cartridge 17, the delivery lever 26 rocks rearward so that its distal end portion reaches the upper surface region of the disk drive motor 23, as shown in FIG. 2. In consequence, the cartridge delivery lever 26 supports the upper cover 6 from below, so that the upper cover 6 can be prevented from being collapsed even if it is pressed from above.

The circuit board 3 is mounted with a control device such as a CPU. The connector 2, which is in compliance with the standards of PCMCIA, is made integral with the circuit board 3 in a manner such that its terminal is soldered to the front end edge of the circuit board 3, as shown in FIG. 2.

The circuit board 3 is put on the lower surface side of the frame plate 22. The disk drive motor 23 is connected electrically to the circuit board 3 (not shown). Further, the recording/reproducing head element 24 is connected to the circuit board 3 by means of the aforesaid FPC 27.

In assembling the card-type electronic device 1, the elements including the disk drive motor 23, recording/reproducing head element 24, cartridge locking mechanism 25, cartridge delivery lever 26, etc. are first mounted on the upper surface of the frame plate 22. Then, the frame 5 is reversed, the circuit board 3 is put on the lower surface of the frame plate 22 with an insulating sheet 28 between them, and the circuit board 3 is connected to the disk drive motor 23 and the recording/reproducing head element 24.

Further, the connector 2, which is attached to the front end portion of the circuit board 3, is interposed between the respective front ends of the side frame portions 14 and 14' and exposed from the front end of the casing 4 (FIG. 4).

Then, the upper cover 6 is held against the upper surface of the frame 5, and the retaining pieces 11a are aligned individually with the respective entrances of the recesses 19a of the side frame portions 14 and 14', as shown in FIG. 1, and pushed in the direction of arrow X of FIG. 1 (downward) to be fitted individually into the recesses 19a.

Figure 7:
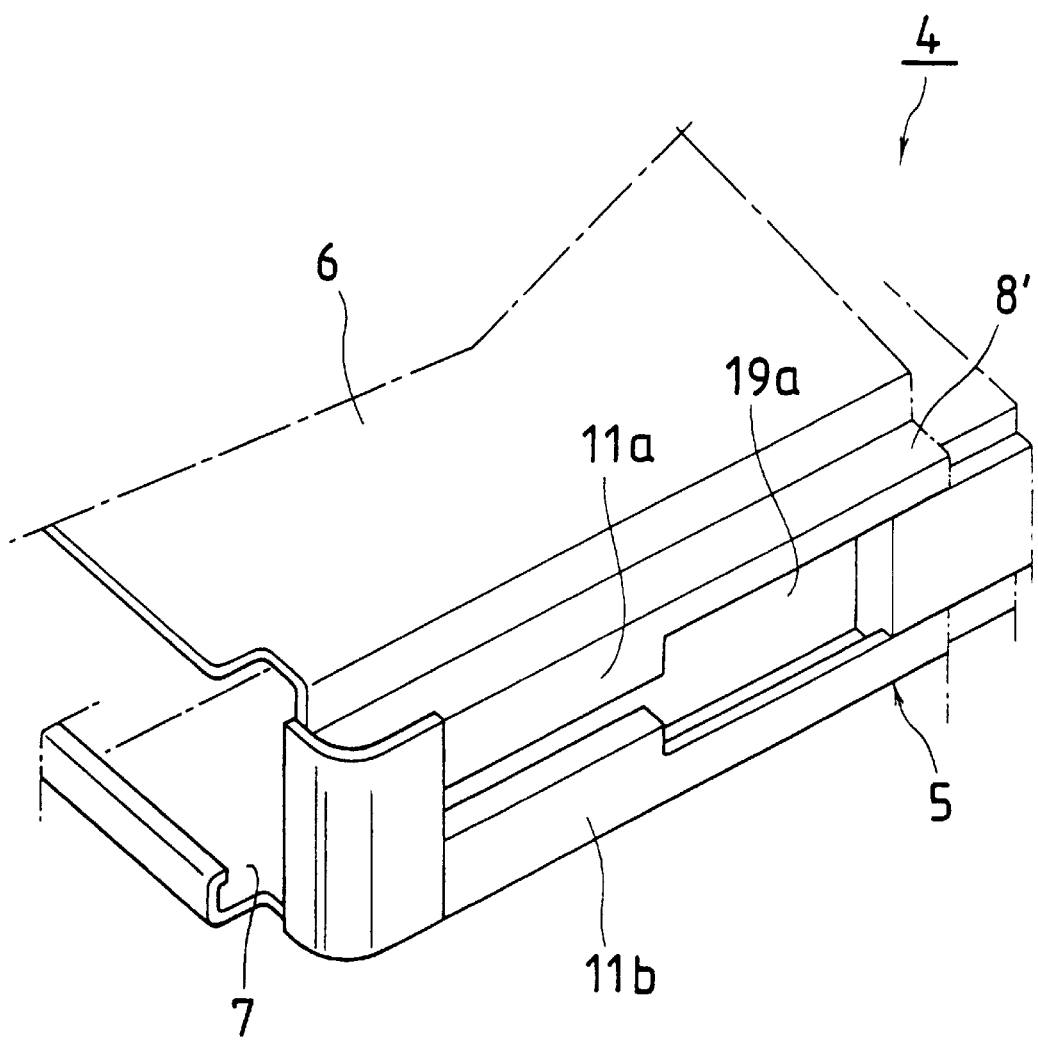
FIG. 7 is a partial perspective view showing a state in which the upper and lower covers shown in FIG. 1 are in engagement with the frame shown in FIG. 1.

Subsequently, the upper cover 6 is pressed against the side frame portions 14 and 14' as it is slid in the direction of arrow Y of FIG. 1 (rearward). Thereupon, the retaining pieces 11a of the upper cover 6 slide rearward in the longitudinal direction of the casing 4 and engage the retaining portions 20a, individually, so that the upper cover 6 and the frame 5 are temporarily fixed to each other (FIG. 7).

Likewise, the lower cover 7 is held against the lower surface of the frame 5, and the retaining pieces 11b are aligned individually with the respective entrances of the recesses 19b of the side frame portions 14 and 14', and pushed in the direction of arrow X' of FIG. 1 (upward) to be fitted individually into the recesses 19b. Subsequently, the lower cover 7 is pressed against the side frame portions 14 and 14' as it is slid in the direction of arrow Y' of FIG. 1 (rearward). Thereupon, the retaining pieces 11b of the lower cover 7 slide rearward in the longitudinal direction of the casing 4 and engage the retaining portions 20b, individually, so that the lower cover 7 and the frame 5 are temporarily fixed to each other (FIG. 7).

In this case, a heat-sensitive paste layer has been formed on the inner surface of the stepped front edge portion 8 of the upper cover 6 by a printing technique. After the aforesaid temporary fixing is effected, therefore, the front edge portion 8 is heated to 140 to 150° C. so that its paste layer is melted, thereupon a "separable" weak-bond state is established. Then, the inner surface of the front edge portion 8 of the upper cover 6 is bonded to the upper surface of the connector 2 through the paste layer in the weak-bond state. This "separable" state means a state in which the upper cover 6 can be removed relatively easily when it is expected to be removed for inspection or the like, although it cannot be separated in a normal state of use. Thus, "separable" bonding is applied to a case where removal is expected. This adhesive bonding prevents the front end portion of the upper cover 6 from lifting off the upper surface of the frame 5.

On the other hand, the adhesive bonding based on the separable weak bond and fixing by means of screws 29 (FIG. 2) serve as slide preventing means for restraining the retaining pieces 11a of the upper cover 6 from sliding in the longitudinal direction, and prevents the retaining pieces 11a from unexpectedly sliding forward and then slipping out of the recesses 19a.

Further, the inner surface of the stepped front edge portion 8 at the front end portion of the lower cover 7 is coated with a heat-sensitive heavy-duty adhesive agent that cannot be separated with ease. This adhesive bonding, which involves no expected removal, serves as fixing. The front end portion of the lower cover 7 is fixed and prevented from lifting.

Further, the adhesive bonding with this heavy-duty adhesive agent serves as slide preventing means for preventing the retaining pieces 11b from sliding in the longitudinal direction, and prevents the retaining pieces 11b from sliding forward and then slipping out of the recesses 19b.

The screws 29 are first removed when inspecting the disk drive motor 23, recording/reproducing head element 24, cartridge locking mechanism 25, cartridge delivery lever 26, etc. that are mounted on the frame plate 22. Since the bond between the upper cover 6 and the frame 5 can be removed relatively easily, the upper cover 6 can be easily removed in a manner such that the upper cover 6 is moved forward to slide the retaining pieces 11a forward in the longitudinal direction (in the direction opposite to the Y direction of FIG. 1) and draw them out upward (in the direction opposite to the X direction of FIG. 1) along the recesses 19a. In this state, the upper surface of the frame plate 22 is exposed.

When the inspection is finished, the inner surface of the front edge portion 8 of the temporarily removed upper cover 6 is coated with a weak adhesive agent, and the upper cover 6 is attached again to the upper surface of the frame 5. If the upper cover 6 is deformed as it is removed, it is necessary only that a new upper cover 6 be attached in like manner.

If the lower cover 7, like the upper cover 6, is removably fixed to the frame 5 with screws and the weak adhesive agent (taking the removal into consideration), inspection of the lower surface side of the frame plate 22 is also easy.

In the PC card of the PCMCIA Type II, moreover, the stepped front edge portions 8 are formed individually on the respective front end portions of the upper and lower covers 7 in order to make the front end portions thinner than the central portions. Therefore, the upper and lower covers 6 and 7 are slid rearward (in the directions of arrows Y and Y' of FIG. 1) to cause the retaining pieces 11a and 11b and the retaining portions 20a and 20b to engage one another for fear that the front edge portions 8 should be caught by the frame 5. If the PC card is not formed with the stepped edge portions 8, however, the upper cover 6 or the lower cover 7 may be slid forward to cause the retaining pieces 11a and 11b and the retaining portions 20a and 20b to engage one another.

Figure 8:
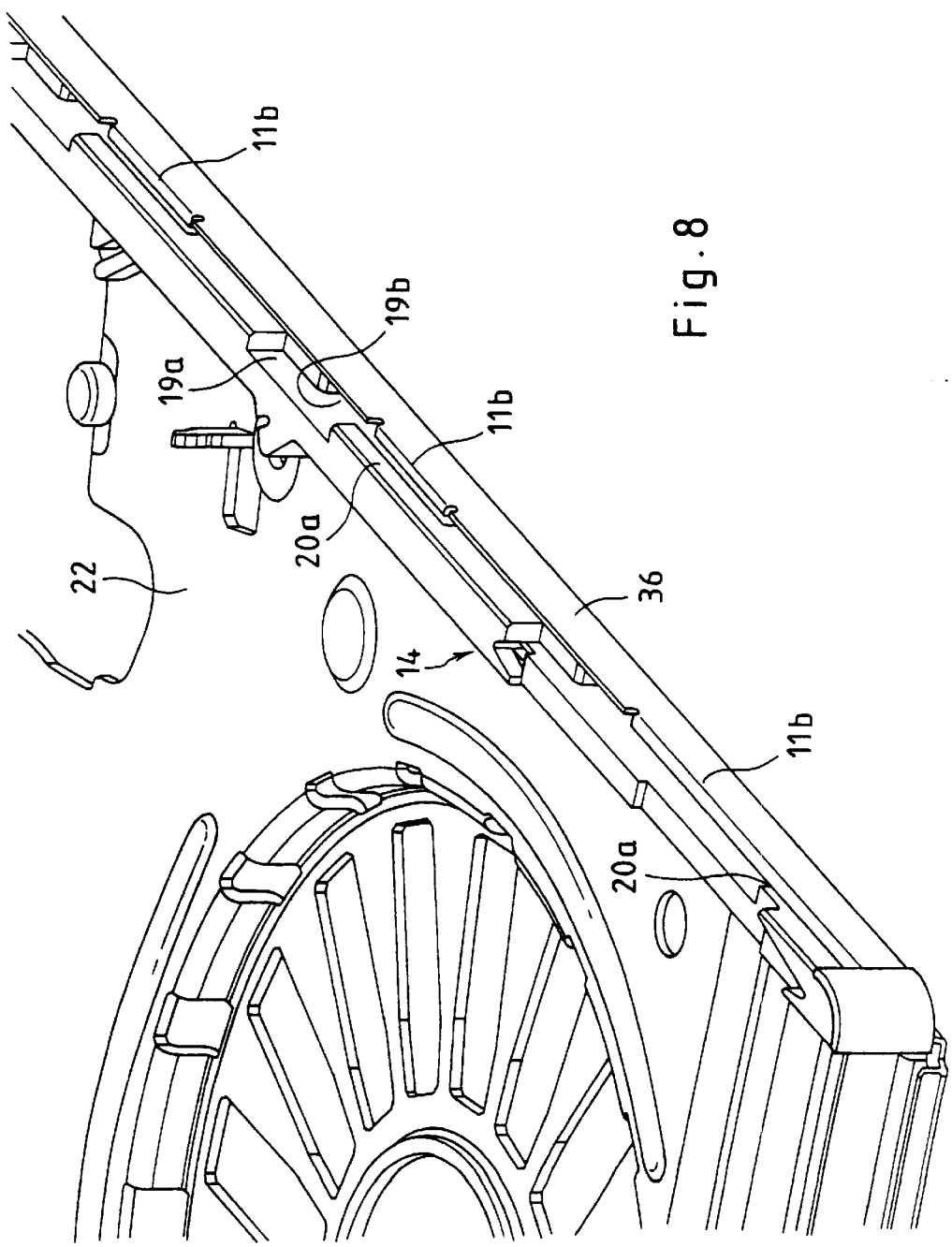
FIG. 8 is a partial perspective view of a card-type electronic device according to a second embodiment of the present invention, showing the construction of its frame in particular.

A second embodiment of the card-type electronic device according to the present invention will now be described with reference to FIGS. 8 to 10. The present embodiment is characterized by the construction of the side faces of its casing 4.

More specifically, left- and right-hand side edge portions 8' of a metallic upper cover 6 are provided individually with bent walls (vertical walls) 35 that are bent downward throughout the length of the cover 6. Each bent wall 35 is provided with three tongues that project further downward from a distal end line L1 of the wall 35. Retaining pieces 11a having a substantially U-shaped cross section are formed by bending these tongues inward from the distal end line L1.

Likewise, left- and right-hand side edge portions 8' of a metallic lower cover 7 are provided individually with bent walls 36 that are bent upward throughout the length of the cover 7. Each bent wall 36 is provided with three tongues that project further upward from a distal end line L2 of the wall 36. Retaining pieces 11b having a substantially U-shaped cross section are formed by bending these tongues inward from the distal end line L2.

Thus, the respective distal end edges (lower end edges) of those portions of the bent walls 35 of the upper cover 6 which are not formed with any tongues (i.e., retaining pieces 11a) are aligned with the respective lower surfaces of the retaining pieces 11a on the distal end line L1, so that each side face of the upper cover 6 forms the continuous bent wall 35 that has a fixed height throughout its length.

Likewise, the respective distal end edges (upper end edges) of those portions of the bent walls 36 of the lower cover 7 which are not formed with any tongues (i.e., retaining pieces 11b) are aligned with the respective upper surfaces of the retaining pieces 11b on the distal end line L2, so that each side face of the lower cover 7 forms the continuous bent wall 36 that has a fixed height throughout its length.

In the present embodiment, the opposite sides of the tongues 10 are slit individually toward the bent walls 35 and 36 so that the retaining pieces 11a and 11b can be easily formed by bending the tongues 10.

Figure 9:
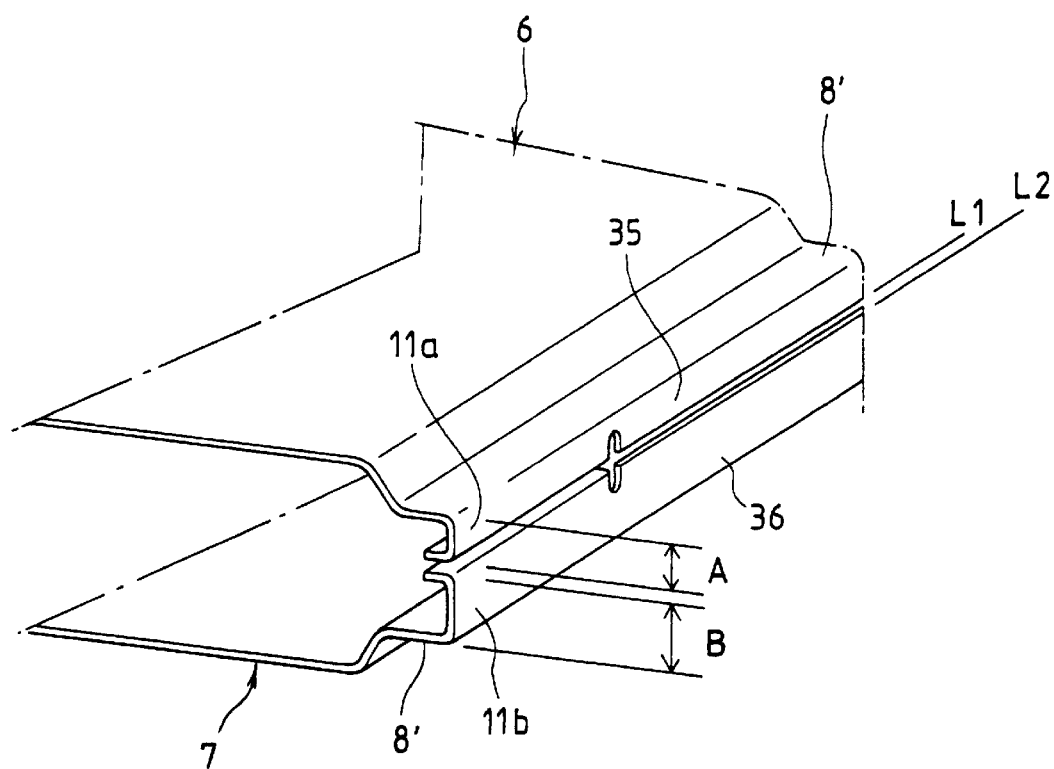
FIG. 9 is a partial perspective view of the card-type electronic device according to the second embodiment of the present invention, showing a side face of its casing in particular.

In the present embodiment, moreover, a width A of each bent wall 35 of the upper cover 6 is half as large as a width B of each bent wall 36 of the lower cover 7 (A≈B/2), as shown in FIG. 9.

Side frame portions 14 and 14' are constructed substantially in the same manner as those of the first embodiment, and each of them comprises recesses 19a and 19b for vertically guiding the retaining pieces 11a and 11b of the upper cover 6 and the lower cover and retaining portions 20a and 20b capable of engaging the retaining pieces 11a and 11b, individually.

Figure 10:
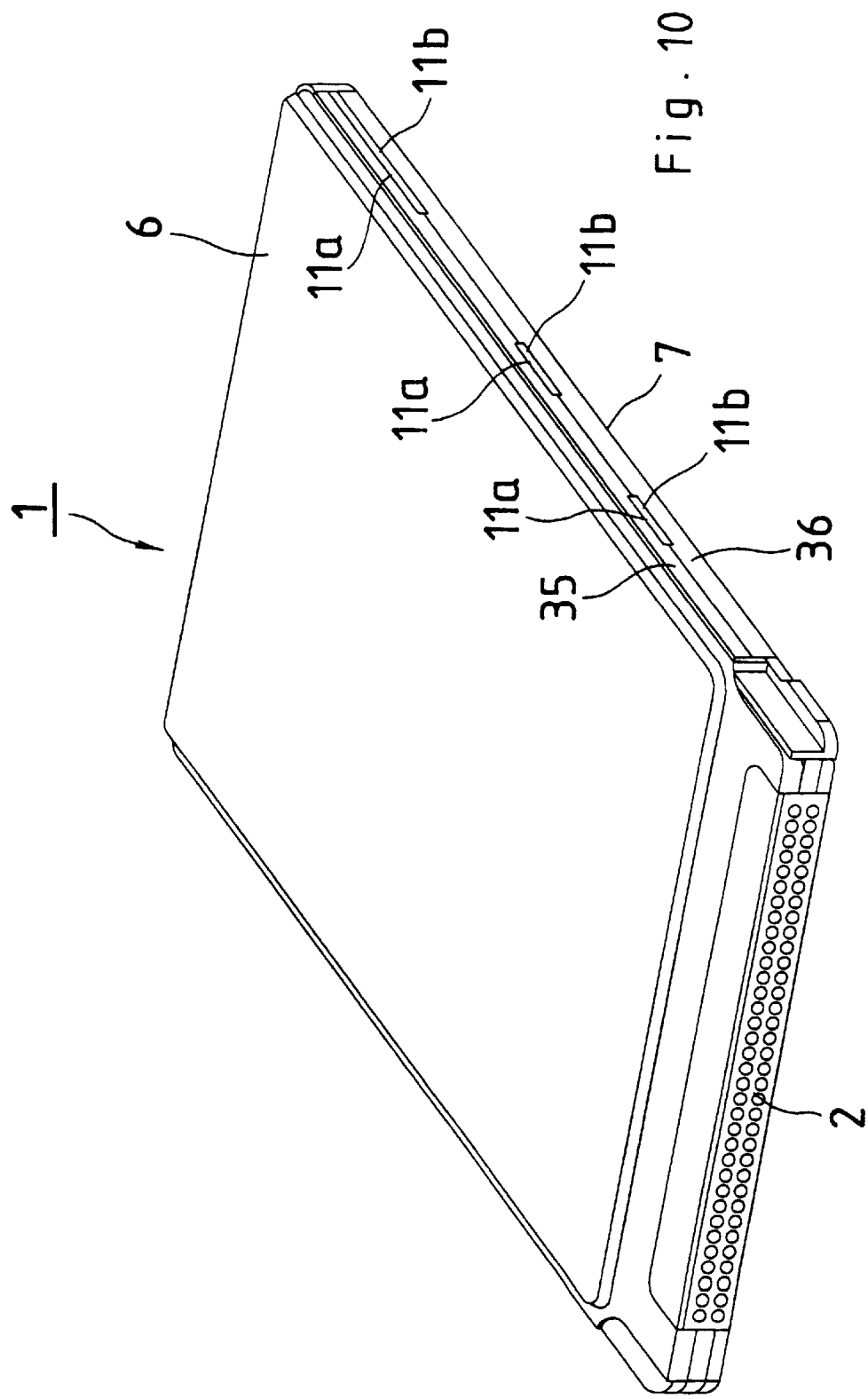
FIG. 10 is a perspective view showing an external appearance of the card-type electronic device according to the second embodiment of the present invention.
Figure 11:
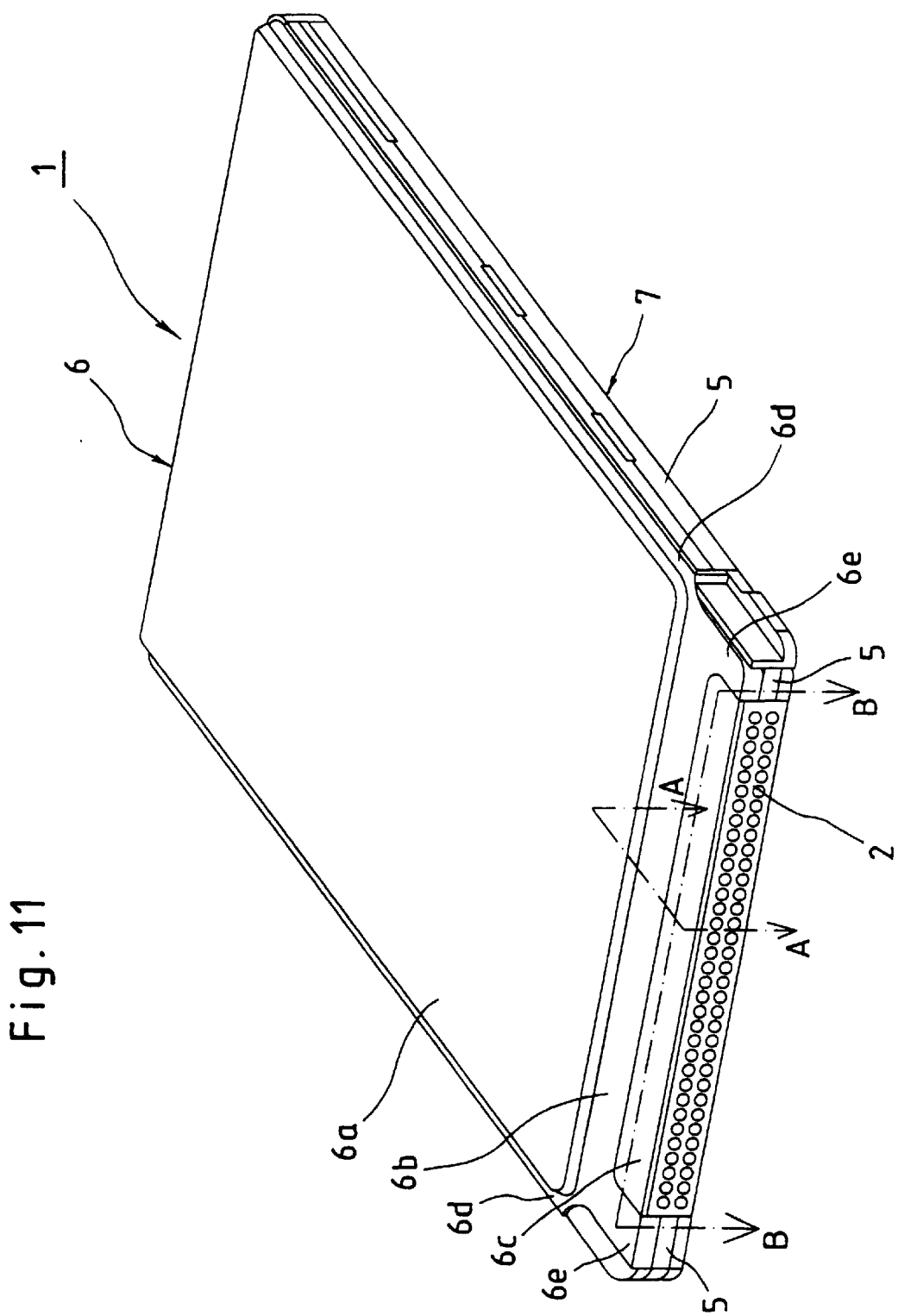
FIG. 11 is a perspective view showing an external appearance of a card-type electronic device according to a third embodiment of the present invention.

When the upper cover 6 and the lower cover are attached to the frame 5 to form the casing 4, however, the longitudinal side faces of the casing 4 are covered substantially entire by the bent walls 35 of the upper cover 6 and the bent walls 36 of the lower cover 7 (FIG. 10). In consequence, the side faces of the casing 4 are free from surface irregularity, so that the casing 4 can be smoothly loaded into or unloaded from a slot of an information apparatus or the like.

A spring (not shown) or the like for grounding the card-type electronic device 1 inserted in a slot of a portable computer protrudes from the inner side wall of the slot. This grounding spring catches nothing when it touches the casing 4 of which the side faces are covered substantially entire by the bent walls 35 of the upper cover 6 and the bent walls 36 of the lower cover 7. Thus, the spring can maintain steady contact with the casing 4 of the card-type electronic device 1.

Usually, the grounding spring is located in a substantially central region in the height direction (thickness direction) the inner side wall of the slot. If the width A of each bent wall 35 of the upper cover 6 is made different from the width B of each bent wall 36 of the lower cover 7, the grounding spring faces the bent walls 35 of the upper cover 6 or the bent walls 36 of the lower cover 7 (wider bent walls) and does not face the gaps or boundaries between the bent walls 35 of the upper cover 6 and the bent walls 36 of the lower cover 7. Thus, the grounding spring can maintain steadier contact with the casing 4 of the card-type electronic device 1.

A third embodiment of the card-type electronic device according to the present invention will now be described with reference to FIGS. 11 to 13B.

The present embodiment solves the problem of interposition of a connector 2 between an upper cover 6 and a lower cover 7 that is aroused when the upper cover 6 and the lower cover are thinned so that a storage space for internal components is enlarged correspondingly.

In the present embodiment, the upper cover 6 is obtained by pressing a thin SUS sheet with the thickness (t1) of 0.15 mm so that a first flat portion is formed in its central portion, and a second flat portion, which is depressed toward the inner surface side from the first flat portion, is formed extending from the front portion to the opposite side portions, as in the prior art described with reference to FIGS. 14 to 15B. The first flat portion serves as an internal component storage portion 6a, and the second flat portion as a connector storage portion 6b and an insertion guide portion 6d.

In the prior art example, the upper cover 6 has the sheet thickness (t1) of 0.20 mm. However, the upper cover 6 of the present embodiment has the sheet thickness of 0.15 mm, which is 0.05 mm smaller.

The upper cover 6 of the present embodiment is formed further with a third flat portion (connector junction 6c) that is depressed toward the inner surface side of the second flat portion (connector storage portion 6b) by a margin corresponding to the reduction (0.05 mm) of the sheet thickness of the upper cover 6. Then, the inner surface side of the third flat portion and the connector are fixed with use of an adhesive agent.

While the construction of the upper cover 6 has been described above, the lower cover 7 has the same construction with the upper cover 6. More specifically, the lower cover 7 is also formed having first, second, and third flat portions by pressing a rectangular flat sheet material with a thickness of 0.15 mm.

On the other hand, the connector 2 for external connection has the same dimensions with the prior art example. More specifically, the thickness (T1) of a collar 2a is 3.3 mm (standard), and the thickness (T2) of a stepped junction 2b to be inserted between the second flat portion (connector storage portion 6b) of the upper cover 6 and the second flat portion (connector storage portion 7b) is 2.8 mm. The difference in level (T3) between T1 and T2 is 0.25 mm (=(3.3−2.8)//2).

Further, a thickness T4 of a frame 5 is 2.9 mm, which is 0.1 mm (0.05 mm for each side) greater than the sheet thickness T4 (=2.8 mm) of the conventional frame 5.

The distance from the outer surface of the connector storage portion 6b of the upper cover 6 (and the insertion guide portion 6d that is flush with the connector storage portion 6b) to the connector storage portion 7b of the lower cover 7 (and an insertion guide portion 7d that is flush with the connector storage portion 7b) is the sum total (3.3 mm) of the thickness (t1×2=0.3 mm) of the upper and lower covers 6 and 7, a margin (t2×2=0.1 mm) for adhesive bonding, and the thickness (T4=2.9 mm) of the frame 5. This value is equal to the thickness T1 (=3.3 mm) of the connector collar 2a.

Accordingly, the upper and lower surfaces of the collar portion 2a of the connector 2 are flush with the respective surfaces of the insertion guide portions 6d and 7d and the connector storage portions 6b and 7b for use as second flat portions on the upper and lower covers 6 and 7.

As in the conventional case, the connector storage portions 6b and 7b of the upper and lower covers 6 and 7 can satisfactorily define a storage space for a connector 2, a circuit board 3, etc.

The respective third flat portions of the upper and lower covers 6 and 7, which are designed for bonding with the connector 2, serve as connector junctions 6c and 7c, individually.

Figure 12:
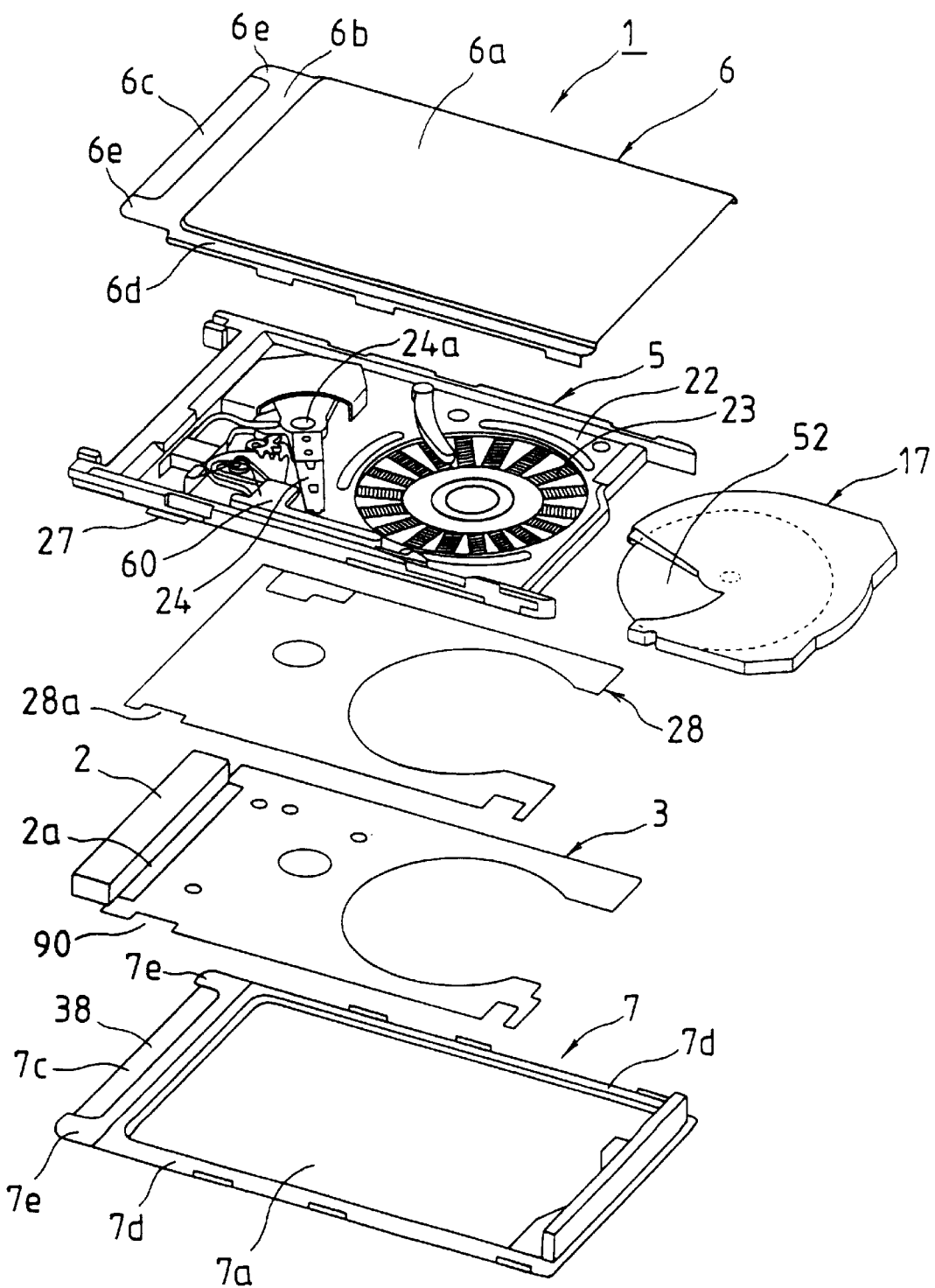
FIG. 12 is an exploded perspective view of the card-type electronic device shown in FIG. 11.

As shown in FIG. 12, moreover, the connector junctions 6c and 7c for use as the third flat portions are formed in the center of the respective distal end portions of the connector storage portions 6b and 7b of the upper and lower covers 6 and 7. Thus, the second flat portions are formed on the left- and right-hand end portions of the respective distal end portions of the connector storage portions and behind their corresponding third flat portions.

Figure 13A:
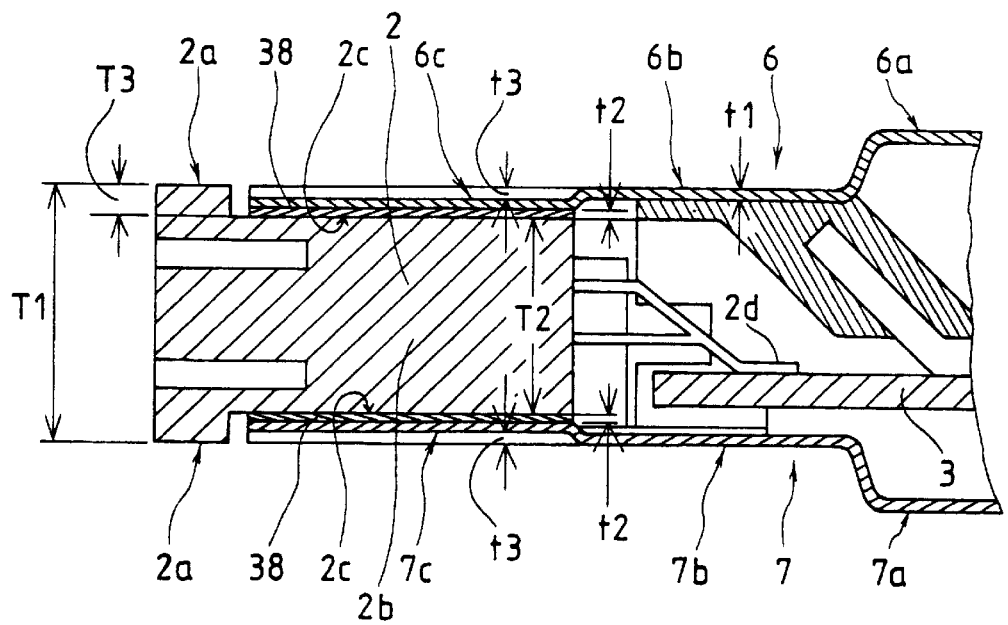
FIG. 13A is a sectional view of the card-type electronic device of FIG. 11 taken along line A—A.
Figure 13B:
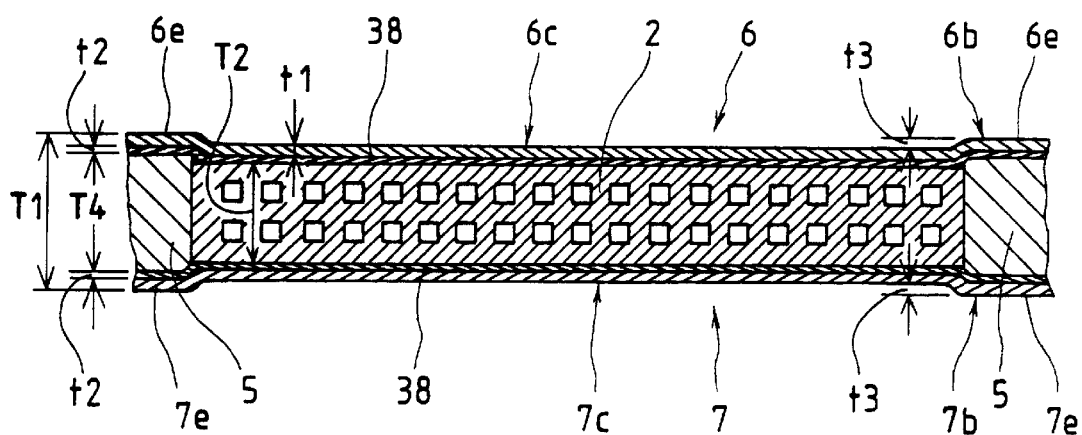
FIG. 13B is a sectional view of the card-type electronic device of FIG. 11 taken along line B—B.

As seen from FIG. 13B also, connector guide portions 6e and 7e project on the outer surface side from the connector junctions 6c and 7c by a margin t3 (=0.05 mm) that corresponds to the reduction of the sheet thickness of the upper and lower covers 6 and 7. In order to adjust the margin (t2) for adhesive bonding to 0.05 mm, therefore, the thickness of the frame 5 is increased by 0.05 mm for each of upper and lower sides, so that the thickness (T4) of the frame 5 is 2.9 mm.

The connector guide portions 6e and 7e are designed to project on the outer surface side from the connector junctions 6c and 7c by the margin t3 (=0.05 mm) that corresponds to the reduction of the sheet thickness of the cover members. Therefore, the distance between the connector guide portions 6e and 7e is adjusted to a standardized dimension, 3.3 mm, which is equal to the thickness of the insertion guide portions 6d and 7d (FIG. 12).

Thus, the connector guide portions can be caused smoothly to engage a reception-side connector (not shown) on the side of an external electronic device without play, so that they can be attached to the external electronic device steadily and securely.

The adhesive bonding between the surface of the frame 5 and the respective inner surface sides of the insertion guide portions 6d and 7d and the connector storage portions 6b and 7b formed on the upper and lower covers 6 and 7 and the adhesive bonding between the inner surface side of the connector junctions 6c and 7c and a joint surface 2c of the connector 2 are based on the application of an adhesive agent 38 by the screen printing method, as in the conventional case. As mentioned before, however, the thickness t2 (margin for adhesive bonding) of the adhesive layer is about 0.05 mm, and desired bonding strength can be secured with use of the margin for adhesive bonding corresponding to this thickness. A double-coated tape may be used in place of the application of the adhesive agent 38.

Even if the upper and lower covers 6 and 7 are reduced in sheet thickness, as mentioned before, the bonding strength can be secured by drawing them for the reduction in thickness by pressing.

Corresponding to variation in thickness of the respective stepped junctions of connectors that vary in set dimensions according to manufactures, which arouses a problem in the prior art, the desired bonding strength can be secured with high workability for adhesive bonding by only adjusting the depth of drawing as the upper and lower cover members are pressed.

The following is a description of a manufacturing method for the upper cover 6 shown in FIGS. 11 to 13B.

One substantially rectangular flat sheet material (SUS sheet) having a sheet thickness (t1) of 0.15 mm and a given size is pressed.

First, in a first pressing process, the first flat portion (internal component storage portion 6a) is formed on the outer surface side of the flat sheet with use of the second flat portion (connector storage portion 6b and insertion guide portion 6d) as a reference plane.

Then, in a second pressing process, the third flat portion (connector junction 6c) at which the connector 2 and the upper cover 6 are joined is formed on the inner surface side (side opposite from the first flat portion) of the flat sheet with use of the second flat portion as a reference plane.

A manufacturing method for the lower cover 7 shown in FIGS. 11 to 13B resembles the aforesaid manufacturing method for the upper cover 6, and the lower cover 7 is formed in the aforesaid first and second pressing processes.

In the aforesaid first and second pressing processes, working errors that are involved in the formation of the first flat portion on the outer surface side and the third flat portion on the inner surface side with use of the second flat portion as a reference plane cannot accumulate, so that high-accuracy working can be effected.

In the card-type electronic device 1 shown in FIGS. 11 to 13B, as described above, the third flat portion (connector junction 6c), depressed by about 0.05 mm, is formed on the inner surface side of the second flat portion (connector storage portion 6b) of the upper and lower covers 6 and 7 that constitute the casing, and the inner surface side of the third flat portion and the connector are fixed with use of an adhesive agent. Thus, the device has a special effect such that the respective sheet thicknesses of the upper and lower covers 6 and 7 can be reduced to the extremity to enlarge the internal storage space without ruining the bonding strength of the adhesive agent.

Since the connector storage portion as the second flat portion is left on the longitudinally opposite end portions of the third flat portion, moreover, there may be provided a card-type electronic device that can be securely attached to the reception-side connector on the external electronic device side without play.

Although the so-called PC cards based on the PCMCIA standards have been described as the embodiments herein, the cardtype electronic device of the present invention may be any other article than a PC card.

What is claimed is:

1. A card-type electronic device comprising:
   a casing comprising a frame and two covers individually covering the upper and lower surface of the frame,
   one or a plurality of retaining pieces with a U-shaped cross section protruding from at least one side edge portion of at least one cover, said retaining piece including a bent portion having a distal end portion extending toward the inside of the casing, and said frame being formed with, on the outer surface thereof corresponding to the side edge portion of said cover, a recess for receiving said retaining piece to guide it in a direction substantially perpendicular to a longitudinal direction of the frame and a retaining portion adjoining the recess and adapted to engage the retaining piece fitted in said recess, thereby causing said retaining piece to slide in the longitudinal direction of the frame, wherein:
   said side edge portion of said cover having said retaining piece formed thereon is a flat portion depressed below the central portion of said cover;

said retaining piece is formed on at least one side edge portion of the upper cover and at least one side edge portion of the lower cover, and said frame is formed with said recess and said retaining portion in positions corresponding to said one side edge portion of the upper cover and said one side edge portion of the lower cover, individually;

said recess and said retaining portion formed corresponding to the retaining piece of said upper cover and said recess and said retaining portion formed corresponding to the retaining piece of said lower cover are formed on one and the sane side of the frame; and the height of a vertical wall portion of the retaining piece formed on said upper cover is different from the height of a vertical wall portion of the retaining piece formed on said lower cover.

2. A card-type electronic device comprising:

a casing comprising a frame and two covers individually covering the upper and lower surface of the frame, one or a plurality of retaining pieces with a U-shaped cross section protruding from at least one side edge portion of at least one cover, said retaining piece including a bent portion having a distal end portion extending toward the inside of the casing, and said frame being formed with, on the outer surface thereof corresponding to the side edge portion of said cover, a recess for receiving said retaining piece to guide it in a direction substantially perpendicular to a longitudinal direction of the frame and a retaining portion adjoining the recess and adapted to engage the retaining piece fitted in said recess, thereby causing said retaining piece to slide in the longitudinal direction of the frame, wherein at least one of said covers has a vertical wall of a given height bent up- or downward throughout the length of the one side edge portion and one or more tongues of a given width protruding from the distal end edge of the vertical wall in a manner such that the distal end portion of each tongue extends toward the inside of the casing, said side edge portion, said vertical wall, said tongue(s) forming a retaining piece with a U-shaped cross section, and the opposite sides of said tongue on said vertical wall is slit.

3. A card-type electronic device comprising:

a casing comprising a frame and two covers individually covering the upper and lower surface of the frame, one or a plurality of retaining pieces with a U-shaped cross section protruding from at least one side edge portion of at least one cover, said retaining piece including a bent portion having a distal end portion extending toward the inside of the casing, and said frame being formed with, on the outer surface thereof corresponding to the side edge portion of said cover, a recess for receiving said retaining piece to guide it in a direction substantially perpendicular to a longitudinal direction of the frame and a retaining portion adjoining the recess and adapted to engage the retaining piece fitted in said recess, thereby causing said retaining piece to slide in the longitudinal direction of the frame, wherein:

at least one of said covers has a vertical wall of a given height bent up- or downward throughout the length of the one side edge portion and one or more tongues of a given width protruding from the distal end edge of the vertical wall in a manner such that the distal end portion of each tongue extends toward the inside of the casing, said side edge portion, said vertical wall, and said tongue(s) forming a retaining piece with a U-shaped cross section;

said retaining pieces with a U-shaped cross section, composed of said side edge portion, said vertical wall, and said tongue each, are formed individually on at least one side edge portion of the upper cover and the side edge portion of the lower cover corresponding to said side edge portion, and said recess and said retaining piece are formed on those sides of the frame which correspond to said respective side edges of the upper and lower covers, in positions corresponding to the respective retaining pieces of the upper and lower covers, individually, and wherein the lower end of the vertical wall of the retaining piece of the upper cover and upper end of the vertical wall of the retaining piece of the lower cover substantially abut against each other so that there is no gap between the ends when the respective retaining pieces of the upper and lower covers engage the retaining portion of the said frame; and the height of said vertical wall formed on said upper cover is different from the height of the vertical wall portion of the retaining piece formed on said lower cover.

* * * * *

UNITED STATES PATENT AND TRADEMARK OFFICE
CERTIFICATE OF CORRECTION

PATENT NO.    : 6,577,506 B1
DATED         : June 10, 2003
INVENTOR(S)   : Maki Wakita and Katsutoshi Mukaijima It is certified that error appears in the above-identified patent and that said Letters Patent is hereby corrected as shown below:

Column 2,
Line 49, after "may" delete "is";

Column 9,
Line 6, delete "Longitudinal" and insert -- (longitudinal --;

Column 17,
Line 12, delete "sane" and insert -- same --.

Signed and Sealed this

Twentieth Day of July, 2004

JON W. DUDAS
*Acting Director of the United States Patent and Trademark Office*